United States Patent [19]

Nakamura et al.

[11] Patent Number: 5,361,382
[45] Date of Patent: Nov. 1, 1994

[54] METHOD OF CONNECTING OPTICAL WAVEGUIDE AND OPTICAL FIBER

[75] Inventors: Shirou Nakamura; Takeo Shimizu; Hisaharu Yanagawa; Toshihiko Ohta; Takashi Shigematsu; Toshihiro Ochiai; Koichi Kobayashi, all of Tokyo, Japan

[73] Assignee: The Furukawa Electric Co., Ltd., Tokyo, Japan

[21] Appl. No.: 966,147

[22] PCT Filed: May 20, 1992

[86] PCT No.: PCT/JP92/00643
§ 371 Date: Jan. 7, 1993
§ 102(e) Date: Jan. 7, 1993

[87] PCT Pub. No.: WO92/21047
PCT Pub. Date: Nov. 26, 1992

[30] Foreign Application Priority Data

May 20, 1991 [JP] Japan ................................. 3-115034
Mar. 18, 1992 [JP] Japan ................................. 4-62031
Mar. 18, 1992 [JP] Japan ................................. 4-62545

[51] Int. Cl.⁵ .............................................. G02B 6/30
[52] U.S. Cl. ........................................ 385/49; 359/900; 385/147; 385/14
[58] Field of Search ................... 385/147, 14, 39, 49, 385/50, 24, 63, 129, 132; 359/900

[56] References Cited

U.S. PATENT DOCUMENTS 5,015,059 5/1991 Booth et al. .......................... 385/49
5,123,068 6/1992 Hakoun et al. ...................... 385/49

FOREIGN PATENT DOCUMENTS

1-232307 9/1989 Japan .
2-62502 3/1990 Japan .
2-125209 5/1990 Japan .

*Primary Examiner*—Rodney B. Bovernick
*Assistant Examiner*—John Ngo
*Attorney, Agent, or Firm*—Frishauf, Holtz, Goodman & Woodward

[57] ABSTRACT

A method of connecting waveguides and optical fibers includes the steps of forming the waveguides and a marker at the same time on a waveguide substrate when patterning the waveguides by a photolithography method, forming a clad layer on a region other than another region when the marker is formed so as to embed the waveguides, and forming a fitting pin groove at a position corresponding to a position of the marker. By using this fitting pin groove, a waveguide module and an optical fiber connector are connected so as to connect each of the waveguides and each of the optical fibers with each other. With this method, waveguides and optical fibers can be aligned and connected with each other easily and in a short period of time without employing an expensive aligning device.

10 Claims, 11 Drawing Sheets

METHOD OF CONNECTING OPTICAL WAVEGUIDE AND OPTICAL FIBER

TECHNICAL FIELD

The present invention relates to a method of connecting optical waveguides and optical fibers used in an optical communication system.

PRIOR ART

In general, waveguide elements are used as optical members to constitute an optical communication system. The waveguide elements are categorized mainly into two types, i.e., one type in which a waveguide is formed by stacking silica glass layers each having different refractive index one on another on an Si substrate, for example, and the other in which a waveguide is formed by stacking semiconductor thin films each having a different composition on a special semiconductor substrate made of GaAs, LiN, or the like.

In order to use these silica type waveguides and semiconductor type waveguides as optical members in an optical communication system, the waveguides must be connected to optical fibers so as to input/output light. More specifically, a waveguide and an optical fiber must be connected such that the pattern of a cross section of the waveguide and an arrangement of the optical fibers are aligned with each other.

One of the examples of such a connecting method will now be described in connection with a case where a 1×8 splitter chip of a silica type waveguide and an optical fiber are connected with each other.

A 1×8 splitter chip 12 such as shown in FIG. 1 (A) in which input/output waveguides 11 are formed on a silicon substrate 10 is fixed in a tub-like metal casing 13 by adhesive as shown in FIG. 1 (B), and the casing is annealed to make a waveguide part. Then, an input-side optical fiber connector 15, in which an optical fiber 14 is put through and which can be moved at a degree of freedom of 6, is arranged to face an end face of the casing 13, as can be shown in FIG. 1 (C). Thereafter, as shown in FIG. 1 (D), the position of the input-side optical fiber connector 15 is adjusted such that the optical output from each of the output waveguides 11 of the chip 12, as the result of light made incident from the optical fiber 14, has the maximum value. At the most appropriate position, the input waveguide 11 and the core of the optical fiber 14 are aligned with each other along the optical axis, and fixedly connected with each other by use of YAG laser, adhesive, or the like.

Next, as shown in FIG. 1 (E), an output-side optical fiber connector 16 in which eight optical fibers 14 are fixedly arranged in parallel at the same pitch as that of the output waveguides 11 of the chip 12, is made to face the other end face 13b of the casing 13. Following this, as shown in FIG. 1 (F), the output-side optical fiber connector 16 is moved at a degree of freedom of 6 such that the optical output from each of the eight optical fibers has the maximum intensity of output. At the most appropriate position, the output waveguides 11 and the core of the optical fiber 14 are aligned with each other along the optical axis, and fixedly connected with each other by use of YAG laser, adhesive, or the like. In general, connection of a waveguide and an optical fiber is carried out in the above-described manner.

However, in the case of the above-described case, there is no established standard of alignment between a waveguide formed in a waveguide element and an optical fiber running through an optical fiber connector, and a judgment as to whether there is an error in axis alignment is simply based on the level of the intensity of the output light resulted by incidence of light into the optical fiber. Thus, the reliability of the connection is low.

Further, according to the above-described method, it takes at least one hour to connect a casing end face and an optical fiber connector aligned with each other for one connection, and therefore this method is not suitable for mass production. Also, an extremely expensive alignment fixing device is required.

DISCLOSURE OF THE INVENTION

The purpose of the invention is to provide a method of connecting a waveguide and an optical fiber, in which the waveguide and the optical fiber are aligned with each other easily in a short period of time without using an expensive alignment fixing device.

The purpose can be achieved by a method of connecting a waveguide and an optical fiber, characterized by comprising the steps of forming a waveguide and a marker simultaneously on a waveguide substrate when patterning the waveguide by the lithography method; forming a clad layer on the region other than that of the marker so as to cover the waveguide; forming a groove for a fitting pin at a position with respect to the marker, and connecting a waveguide module and an optical fiber connector by use the groove.

BRIEF DESCRIPTION OF THE DRAWINGS

FIGS. 1 (A), 1 (B), 1 (C), 1 (D), 1 (E) and 1 (F) are explanatory diagrams each showing a step in a conventional method of connecting a waveguide and an optical fiber;

FIGS. 2 (A), 2 (B), 2 (C), 2 (D), and 2 (E) are explanatory diagram each showing a step of manufacture of a waveguide chip used in the method according to the present invention;

FIG. 3 (A) is a plan view of an optical fiber core block used in the method according to the invention, FIG. 3 (B) is a front view of the core block shown in FIG. 3 (A), and FIG. 3 (C) is a side view of the core block shown in FIG. 3 (A);

FIGS. 4 (A), 4 (C), and 4 (E) are diagrams each showing a plan view of a connecting portion, and designed to illustrate the connecting method according to the invention, and FIGS. 4 (B), 4 (D), and 4 (F) are diagrams showing side views of the connecting portions shown in FIGS. 4 (A), 4 (C), and 4 (E), respectively;

FIGS. 12 (A) and 12 (B) are respectively a plan view and side view of a waveguide module connecting fiber and waveguide to each other according to the method of the invention;

FIGS. 13 (A) and 13 (B) are top front views of a waveguide substrate on which a waveguide core and marker are formed, in a step of the manufacturing process of a waveguide module according to the first embodiment of the invention;

FIG. 15 (A) and 15 (B) are top front views of the waveguide substrate, designed to illustrate the embeded region of the waveguide substrate;

FIGS. 18 (A), 18 (B) and 18 (C) are diagrams illustrating how the waveguide module and the optical fibers are connected.

BEST MODE FOR CARRYING OUT THE INVENTION

Examples of the invention will now be described in detail with reference to accompanying drawings.

EXAMPLE 1

A waveguide chip was manufactured in the following manner.

As can be seen in FIG. 2 (A), an $SiO_2$ layer 21 serving as an lower clad layer was formed on a silicon substrate 20 by the flame hydrolysis deposition method. Then, as shown in FIG. 2 (B), the $SiO_2$ layer 21 was coated with $SiO_2+TiO_2$, waveguide materials, by the flame hydrolysis deposition method, to form a waveguide layer 22. A material other than silicon such as ceramic, semiconductor material, glass, or the like, can be used as a material of the substrate.

The waveguide layer 22 was subjected to patterning by the general photolithography method so as to form a waveguide circuit (planer waveguide circuit) 23 and marker 24 as shown in FIG. 2 (C). More specifically, a resist layer (not shown) was formed on the waveguide layer 22, and the layer was etched by use of a mask having a pattern for the waveguide circuit 23 and the marker 24, followed by removal of the resist layer.

Next, as shown in FIG. 2 (D), $SiO_2$ was deposited by the flame hydrolysis deposition method using a mask 25 arranged above a region covering the marker 24 on the $SiO_2$ layer 21 in which the waveguide circuit 23 and the marker 24 were formed, so as to form a upper clad layer. Thus, a waveguide chip 1 as shown in FIG. 2 (E) was manufactured.

Manufacture of an optical fiber core block, i.e. optical fiber block, will now be described.

Figure 1A:
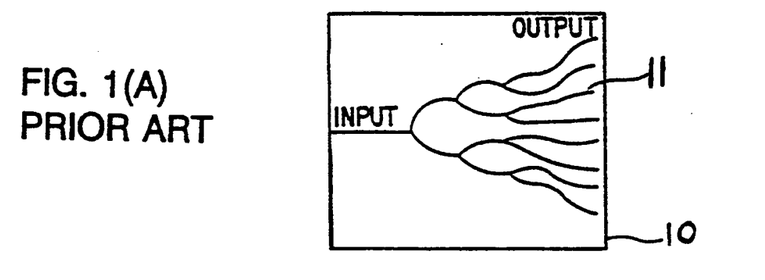
Figure 1B:
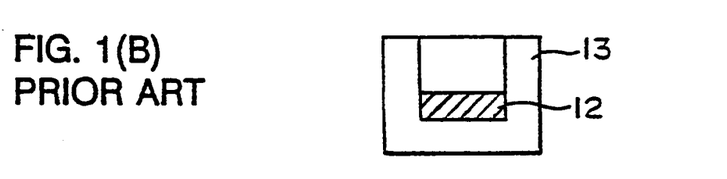
Figure 1C:
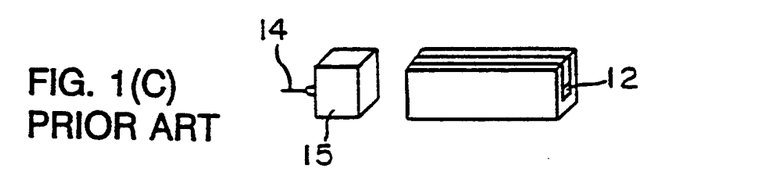
Figure 1D:
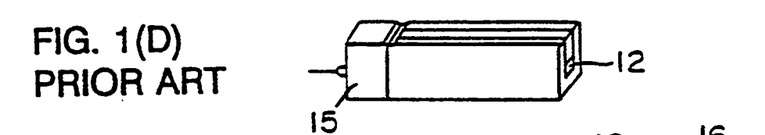
Figure 1E:
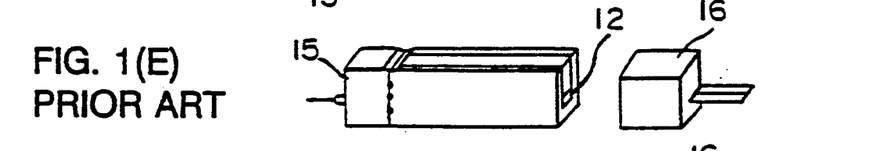
Figure 1F:
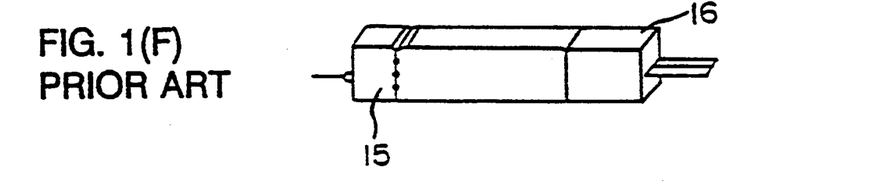
Figure 2A:
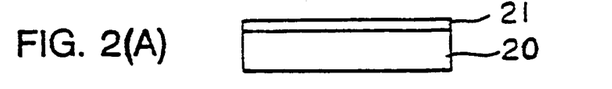
Figure 2B:
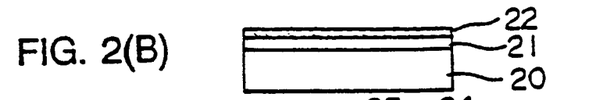
Figure 2C:
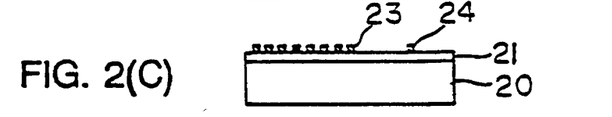
Figure 2D:
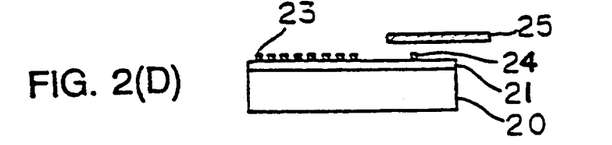
Figure 2E:
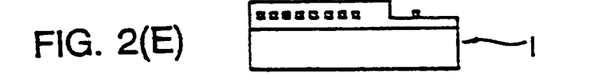
Figure 3A:
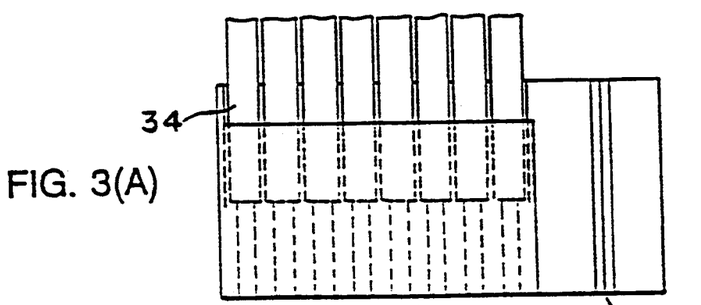
Figure 3B:
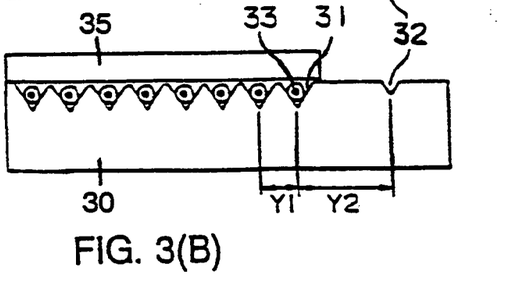
Figure 3C:
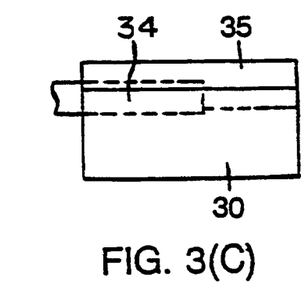

A plate made of single-crystal silicon was processed at a high accuracy such that the top surface and the bottom surface are exactly in parallel with each other, thereby obtaining a substrate. Then, as shown in FIGS. 3 (A), 3 (B) and 3 (C), eight optical fiber V-shaped grooves 31 and a marker V-shaped groove 32 were formed in the substrate 30. The V-shaped grooves 31 were formed such that a distance $Y_1$ between the core portions 34 of optical fibers located in grooves adjacent to each other is the same as the distance between the centers of waveguide circuits 23 adjacent to each other, so as to align a core portion 34 and a corresponding waveguide circuit 23 of a chip with each other. The marker V-shaped groove 32 was located at such a position that a distance $Y_2$ between the core portion 34 of the extremely right optical fiber and the center portions of the marker V-shaped groove 32 was the same as the distance between the center of the extremely right waveguide circuit 23 and the center of the marker 24, so as to align the marker 24 and the V-shaped groove 32 with each other.

An optical fiber 33 was provided in each of the optical fiber V-shaped grooves 31 formed on the substrate 30, and an optical fiber press plate 35 was provided on the region covering the optical fiber V-shaped grooves 31, thereby manufacturing an optical fiber core block 2.

An example of connection between the waveguide chip 1 and the optical fiber core block 2 will be described.

Figures 4A, 4B:
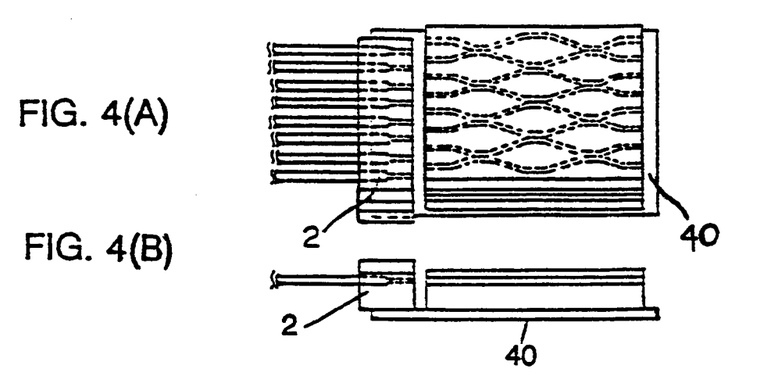

As shown in FIGS. 4 (A) and 4 (B), a waveguide chip 1 and an optical fiber core block 2 were formed on a support plate 40 the surface of which was processed to be flat. The waveguide chip 1 and/or the optical fiber core block 2 may be fixed onto the support plate 40 by means of adhesive or the like.

Figures 4C, 4D:
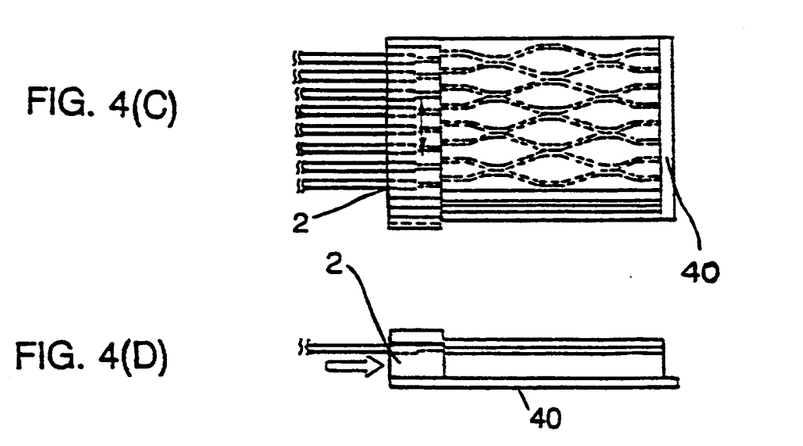
Figures 4E, 4F:
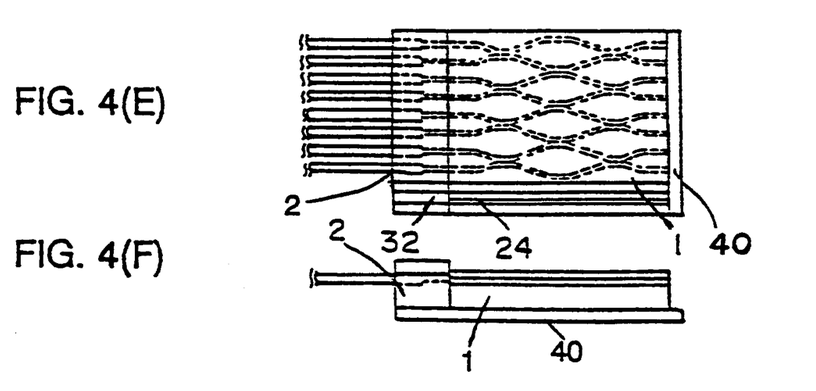

Next, as shown in FIGS. 4 (C) and 4 (D), the connecting face of the waveguide chip 1 and that of the optical fiber core block 2 were brought to face with each other. Then, a pressure was applied to the direction indicated by the arrow shown in FIG. 4 (D), and while pressing the waveguide chip 1 and the core block 2 against the supporting plate 40, the core block 2 was moved in the directions indicated by the arrows shown in FIG. 4 (C). This operation was repeated until the center of the marker 24 of the waveguide chip 1 and the center of the marker V-shaped groove 32 of the optical fiber core block 2 were aligned with each other. Thus, alignment of the waveguide circuits 23 of the waveguide chip 1 with the core portions 34 of the optical fibers 33 was carried out, and then the waveguide chip 1 and the core block 2 were fixed onto the supporting plate 40 by means of adhesive or the like, as shown in FIGS. 4 (E) and (F). It should be noted that after the waveguide chip 1 and the optical fiber core block 2 are fixedly connected with each other, the supporting plate 40 may be removed.

In this embodiment, $SiO_2+TiO_2$ were used as the material of the waveguide, and the waveguide layer was formed by the flame hydrolysis deposition method, but some other waveguide material or other forming method may be used to achieve the same advantage of the invention.

EXAMPLE 2

Figure 5:
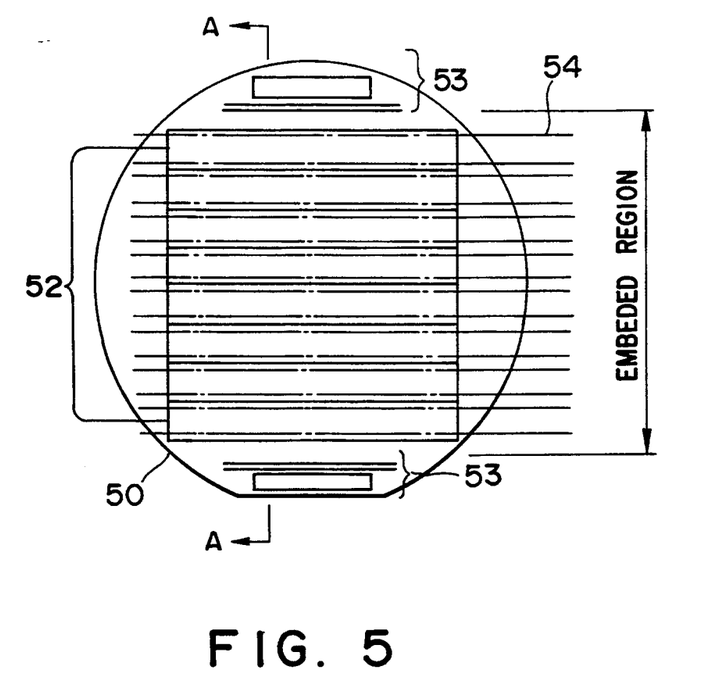
FIG. 5 is a plan view of a 1×8 tree splitter waveguide chip according to the invention.
Figure 6:
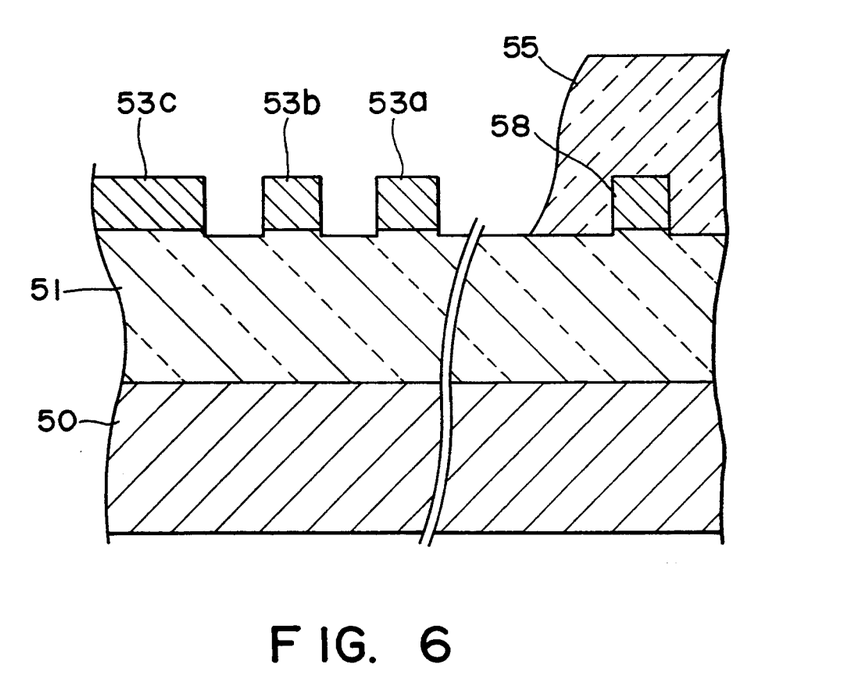
FIG. 6 is a cross section of the waveguide chip shown in FIG. 5, taken along the line A—A.

As shown in FIG. 6, a silica glass underlaying clad layer 51 was formed on a 1-mm-thick 3-inch silicon substrate 50 by the flame hydrolysis deposition method. The assembly was processed into a 3-dimensional waveguide structure as shown in FIG. 5, by semiconductor fine processing techniques such as photolithography and dry etching. Thus, eight waveguide circuits 52 and two pairs of V-shaped groove marker 53 were formed simultaneously on the silicon substrate 50. The V-shaped groove marker 53 sets the standards of position and height for a V-shaped groove, which will be described later.

Next, an upper clad layer 55 was formed by the flame hydrolysis deposition method such that only the waveguide circuit 52 was embedded. Since the V-shaped marker 53 serves as a standard for processing a V-shaped groove, it was not embedded. There are methods as that in which a particular section is not embedded, for example, the method wherein flame hydrolysis deposition is carried out with a mask such as a silicon plate covering the section. In FIG. 5, reference numeral 54 denotes the bottom of the V-shaped groove formed later by a cutting process.

Figure 7:
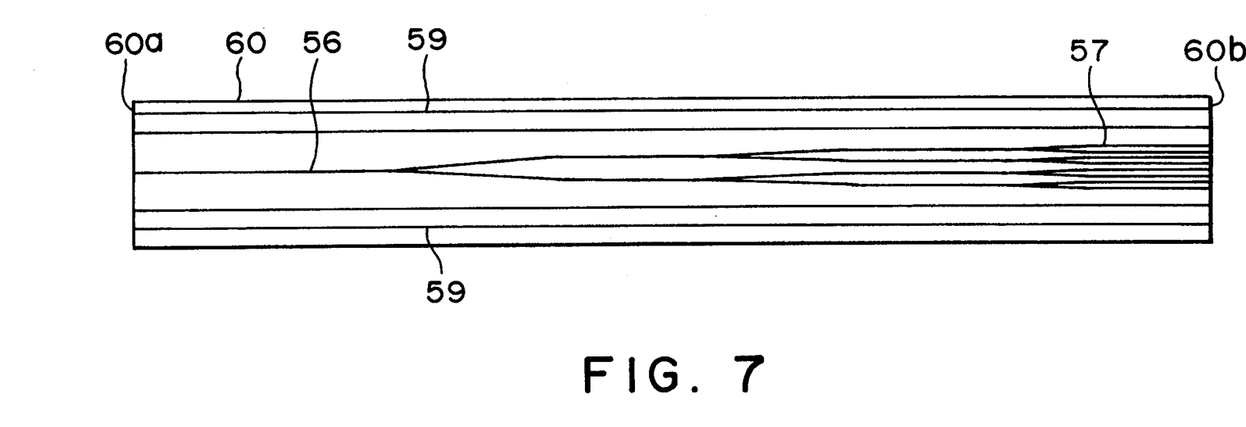
FIG. 7 is a plan view of a 1×8 tree splitter waveguide chip processed to have v-shape grooves according to the invention.

As shown in FIG. 7, a waveguide circuit 52 includes combinations of Y branches, and has a 1×8 tree splitter structure in which one input waveguide 56 is branched out into eight output waveguides 57. Eight of such a structure are continuously formed on the silicon substrate 50. The eight output waveguides 57 in the output section are arranged in parallel with each other with an interval of 250 $\mu$m between an adjacent pair. The waveguide circuit has a structure such as shown in FIG. 6. More specifically, the core 58 of the waveguide circuit has a 8 $\mu$m square, and the circuit has a difference in specific index of refraction of 0.3%, and are compatible with a single mode fiber.

The V-shaped groove marker 53 has a structure such as shown in FIG. 6. More specifically, two lines 53a and 53b each having a width of 10 $\mu$m and a length of 30 mm, and a line 53c having a width of 3 mm, and a length of 20 mm are arranged in parallel with each other with an interval of 10 $\mu$m. Further, as shown in FIG. 5, a set of this structure is provided on both sides of the eight waveguide circuits 52.

Figure 8:
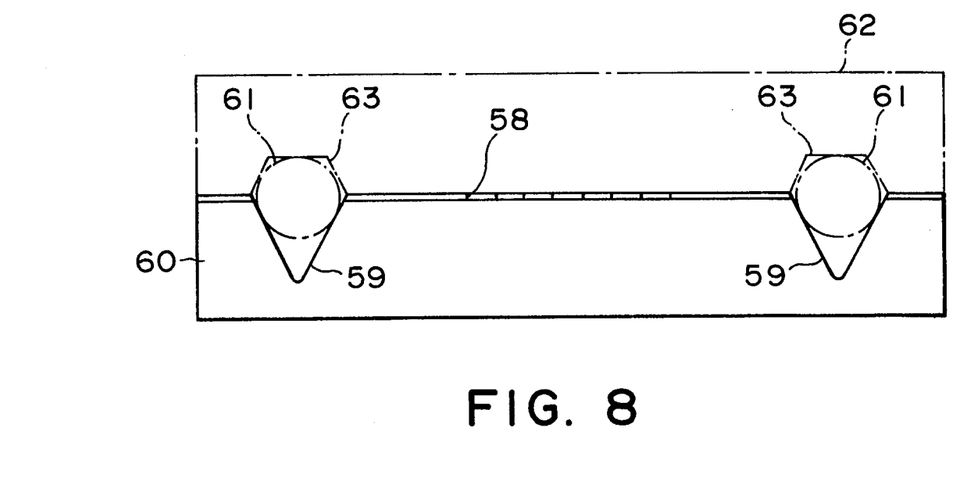
FIG. 8 is a side view of the waveguide chip shown in FIG. 7, taken from the light outputting face side.

Thereafter, a silicon substrate 50 supported by a vacuum chuck is subjected to cutting process by use of a slicer or the like, to make a groove having substantially a V-shape (to be called a V groove hereinafter). Alignment of a V groove 59 with waveguides 56 and 57 is based on the position of the V-shaped groove marker 53 provided on the silicon substrate 50. The alignment is carried out by specifying the position on the top surface of the substrate by image processing using a CCD camera, and the level of the upper surface of the core 58 by use of a capacitance type displacement gauge. A V groove 59 formed by the cutting process has a angle of the v section (the bottom portion) of about 60°, and a depth of about 700 $\mu$m. The groove 59 was formed such that the center of the core 58 is at the same level as the center of the fitting pin 61 having a diameter of 0.7 mm when placed in the groove, as shown in FIG. 8. Further, there were two of V grooves 59 arranged 4.6 mm away from each other, with the waveguides 56 and 57 interposed therebetween.

The silicon substrate 50 thus obtained was sliced into eight chips by use of a dicing saw, thereby obtaining lower substrates 60 on each of which a V groove 59, waveguides 56 and 57 were formed. Each chip had a width of 6.4 mm, and a length of 50 mm.

A ceramic substrate was subjected to cutting process by use of a slicer to form two grooves 63 each having substantially a trapezoid shape such as to press the upper surface of a fitting pin 61. Then, the substrate was divided by a dicing saw into a predetermined number of chips, each of which serves as a press cover 62. Each chip had a width of 6.4 mm, and a length of 50 mm.

Figure 9:
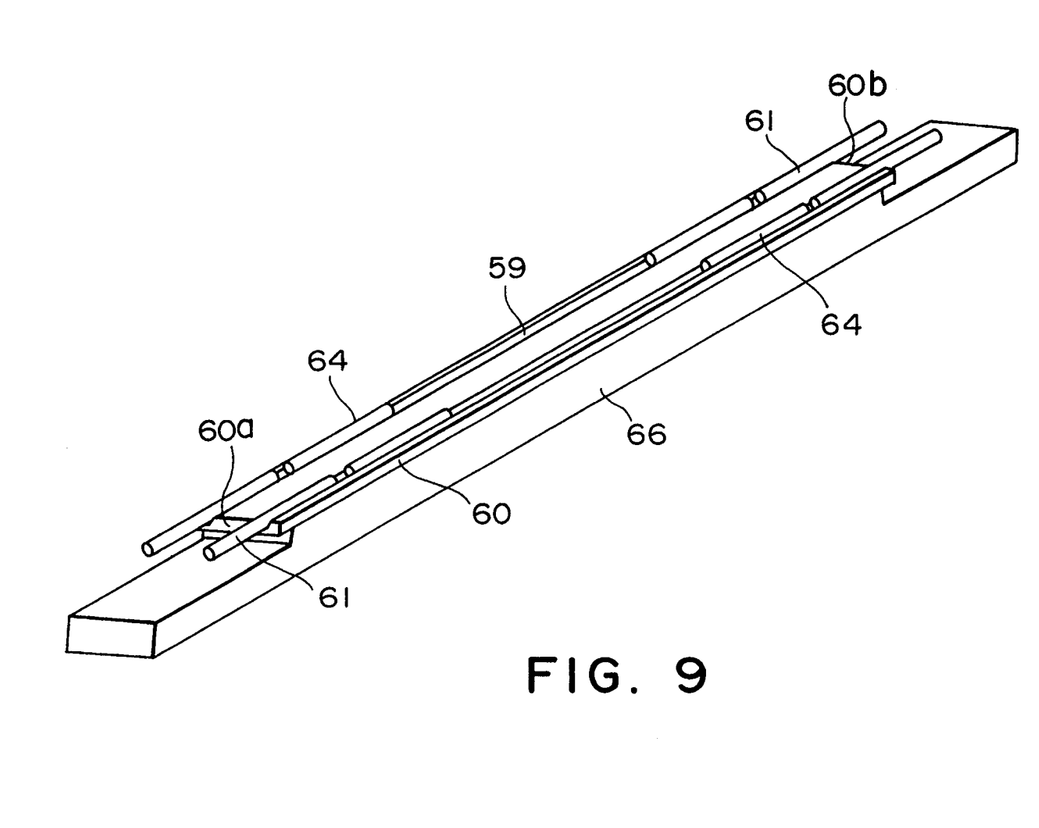
FIG. 9 is a schematic view of a substrate of a waveguide module according to the invention.
Figure 10:
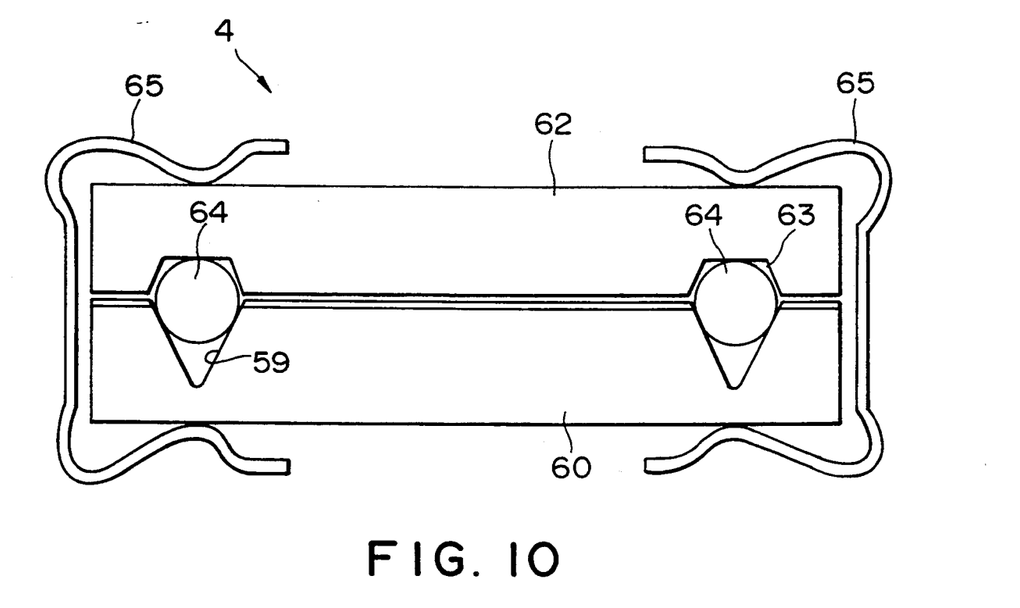
FIG. 10 is a side view of the waveguide module according to the invention, taken from the light outputting face side.

Next, as shown in FIG. 9, a lower substrate 60 was fixed to a fixation base 66 by adhesive, and four substrate fixation pins 64 each having a diameter of 0.7 mm and a length of 8 mm were placed on V-grooves 59 of the lower substrate 60. Each of the substrate fixation pins 64 was arranged such that the middle portion thereof was located at a position 12 mm away from an end 60a or 60b of the surface of the silicon substrate. Following this, as shown in FIG. 10, a press cover 62 was placed on the lower substrate 60, and they are fixed together with adhesive or clamped together by a clamp spring 65, thereby manufacturing a waveguide module 4.

Manufacture of an optical fiber connector will now be described.

Figure 11:
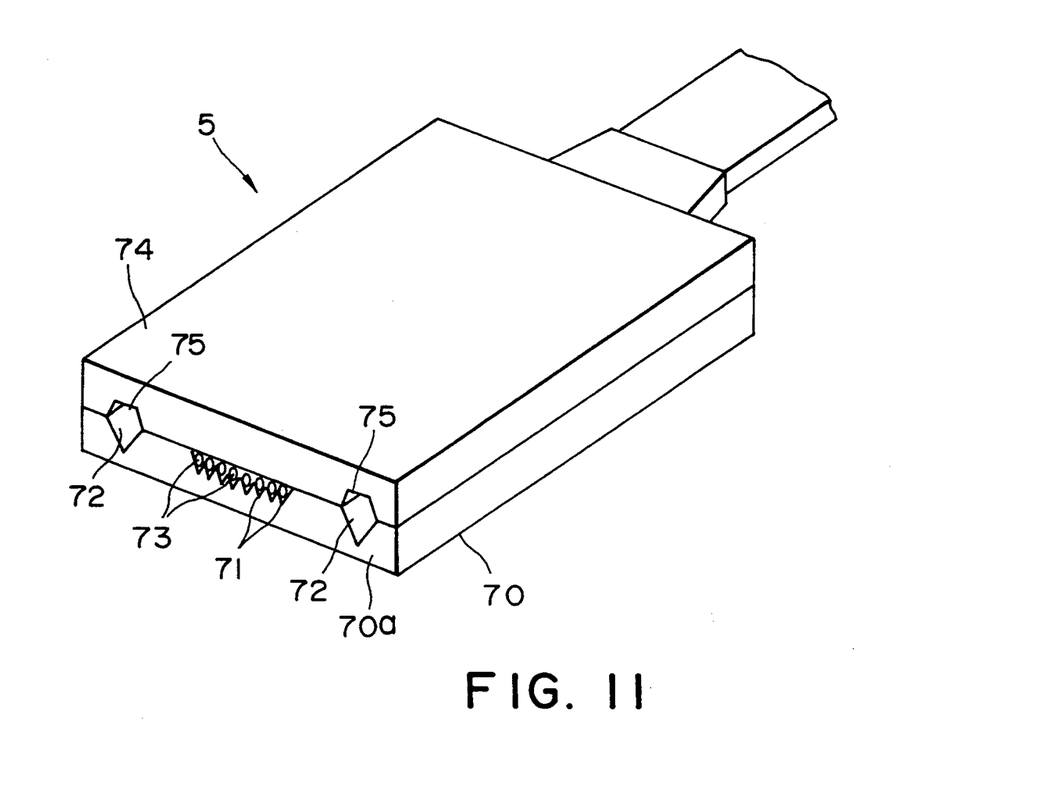
FIG. 11 is a schematic view of an optical fiber connector according to the invention.

As shown in FIG. 11, a lower substrate 70 made of ceramic was subjected to cutting process by use of a slicer, so as to form an optical fiber V groove 71 for supporting an optical fiber, and fitting pin V grooves 72 on both sides of the V groove 71. The grooves 71 and 72 were formed such that the position of each of the optical fiber V groove 71 and the fitting pin V groove 72 corresponds to that of each of the core 58 and the V groove 59 in the end face 60b of the lower substrate 60. The optical fiber V groove 71 thus formed had an angle of the V portion of 60° and a width of 210 $\mu$m. The pitch between adjacent optical fiber V grooves 71 was set at 250 $\mu$m. The fitting pin V groove 72 had an angle of the V portion of 60° and a width of about 700 $\mu$m. The V groove 72 was located such that the core center of each of optical fibers 73, which will be described later, and the center of each of the fitting pins 61 were leveled with each other. There were two fitting pin V grooves 72 arranged 4.6 mm away from each other, interposing the optical fiber V grooves 71 therebetween.

In a similar manner as that of the press cover 62, a connector press cover 74 was manufactured by also forming two grooves each having substantially a trapezoid shape such as to cover the top surface of a fitting pin 61, on a ceramic substrate by cutting process.

A ribbon-like 8-core single mode fiber 73 having an outer diameter of each fiber of 125 $\mu$m and an interval pitch of adjacent fibers of 250 $\mu$m was placed on the optical fiber V grooves 71 of the lower substrate 70, and the press cover 74 was fixedly mounted on the lower substrate 70 by epoxy adhesive. Then, the end face 70a was polished by mirror-like finishing, thereby completing an optical fiber connector 5. In this example, a single-core optical fiber connector to be connected to the output end 60b of the waveguide module 4 was manufactured in a manner similar to the above-mentioned.

Figure 12A:
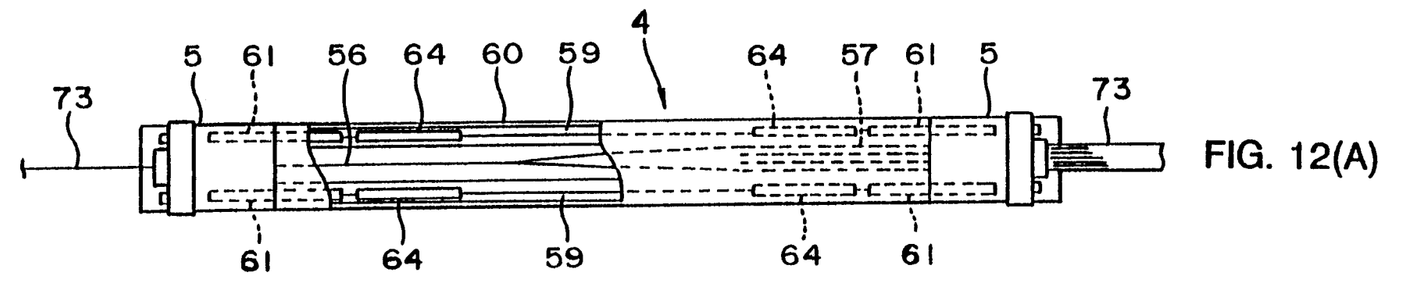
Figure 12B:
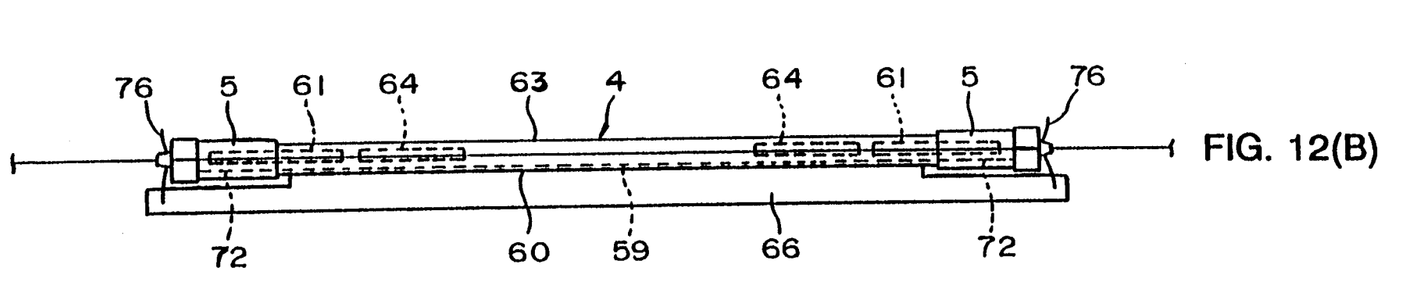

After that, as shown in FIGS. 12 (A) and 12 (B), four fitting pins 61 were inserted into two V grooves 59 of the waveguide module 4, and the fitting pins 61 were fit into the fitting pin V grooves of a multi-core or single-core optical fiber connector 5 for alignment. Thus, the optical fiber connector 5 was arranged such that both ends of the waveguide module 5 were brought into contact with the optical fiber connectors 5. The interface was coated in advance with matching oil or matching grease so as to prevent loss due to Fresnel reflection. Then, a press spring 76 is inserted into a fixation base 66 to apply some weight on the interface.

As described, in this example, the waveguide module and the optical fiber connector are connected with each other by means of fitting pins, and therefore alignment between a waveguide and a guide groove formed on a lower substrate, and an optical fiber and a guide groove or guide hole in the optical fiber connector can be accurately performed. Thus, the waveguide module and the optical fiber connector can be connected with each other easily in a short period of time. In this example, the waveguide element and the optical fiber connector are detachably connected. Consequently, waveguide modules each having a different pattern can be connected to an optical fiber connector without performing alignment along with an optical axis.

A waveguide element and an optical fiber connector manufactured in this example were connected with each other so as to examine its connection in terms of connection loss. The connection loss was an average of 0.5 dB, with a maximum of 1 dB, and thus it was confirmed that alignment deviations between waveguides and optical fibers can be suppressed, and connection of them can be carried out at a small loss, according to the present invention.

EXAMPLE 3

Figure 13A:
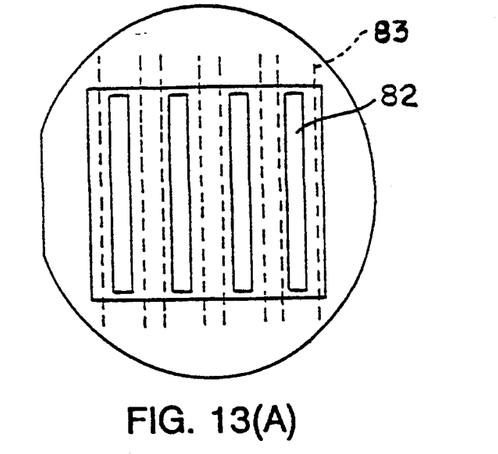
Figure 13B:
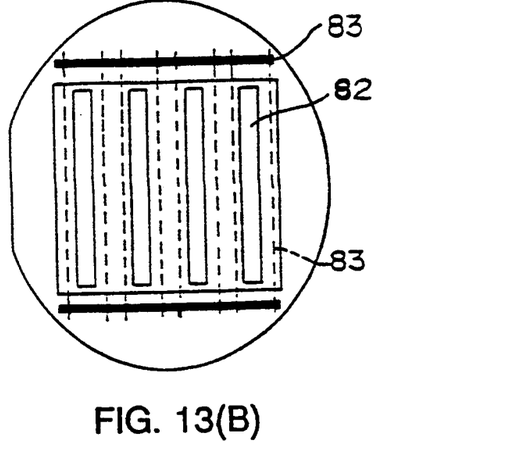
Figure 14:
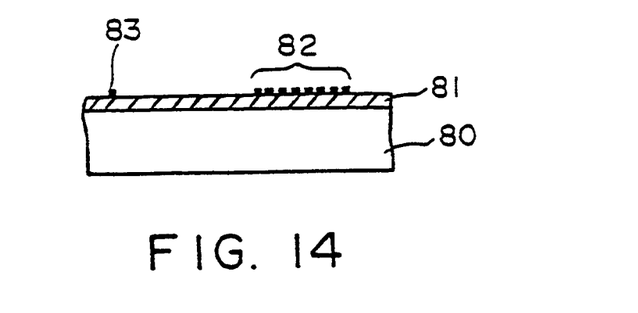
FIG. 14 is a cross section of the waveguide substrate shown in FIG. 13.

A lower clad layer 81 and a core layer were formed on a silicon substrate 80 by the flame hydrolysis deposition method so as to manufacture a slab waveguide. Then, as shown in FIG. 13 (A) and FIG. 14, a core layer was patterned by photolithography and dry etching so as to form four waveguide cores 82 and eight markers 83, one marker 83 being formed on either side of each waveguide core 82. Further, as shown in FIG. 13 (B), ribbon-like markers each having a width of 2.5 mm and a length of 50 mm were formed such as to run across the markers. The photomask used by the photolithography had both waveguide core pattern and marker pattern.

Figure 15A:
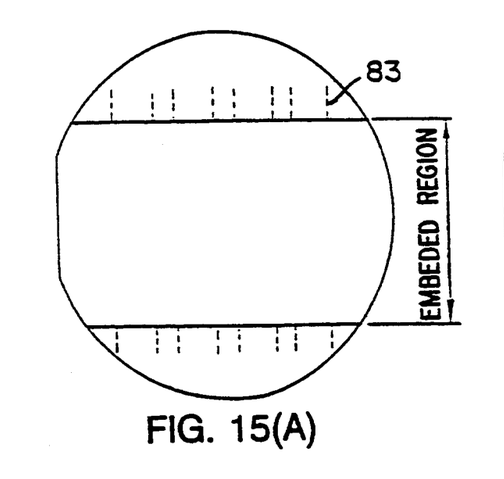
Figure 15B:
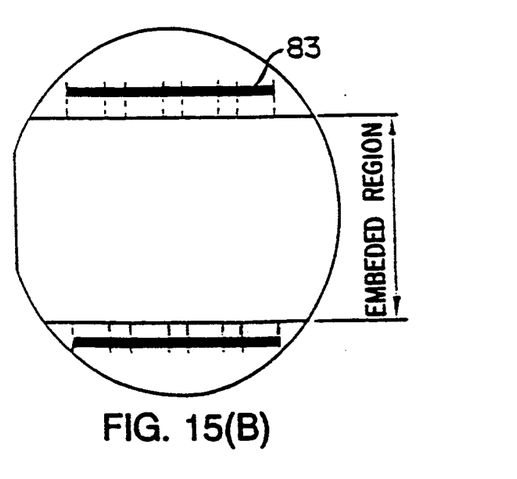

Next, an upper clad layer 84 was formed on a embeded including waveguide cores 82, as shown in FIGS. 15 (A) and 15 (B), to embed the waveguide cores 82. Since the markers 83 were to be used for alignment of a V-shaped groove to be formed later, particular portions of the markers were left uncovered by the upper clad layer 84. This can be achieved, for example, by depositing an upper clad layer by flame hydrolysis deposition method with a portion of each of the marker 93 being covered by a silicon plate or the like.

Figure 16:
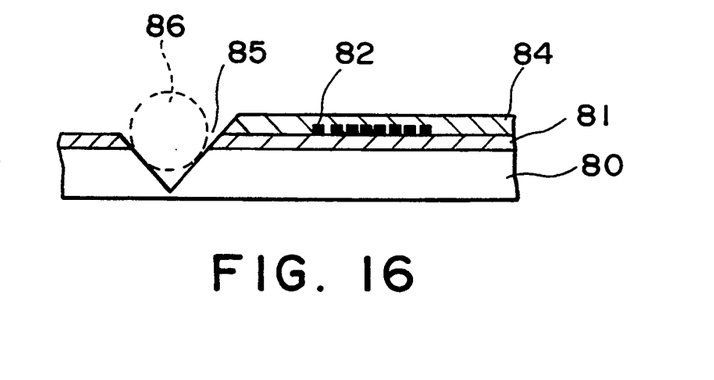
FIG. 16 is a cross section of the waveguide substrate on which a v-shape groove is formed.

Then, the silicon substrate 80 is subjected to cutting process by use of a slicer, so as to form V grooves 85 thereon. As shown in FIG. 16, one V groove 85 was formed such that the center of the groove 85 was aligned with the center of each of the markers, and the depth of the V groove 85 was adjusted such that the center of each marker 83 was aligned with the center of the cross section of a fitting pin 86 when placed on the V groove 85. Lastly, the substrate 80 was sliced into chips, thereby obtaining a plurality of waveguide elements 6.

Thereafter, the silicon substrate 80 was subjected to cut process using a slicer to form a V-shaped groove 85. More specifically, the cutting process was performed such that the center position of the V-shaped of the groove 85 was aligned with the center of each marker 83, and the depth of the V-shaped groove 85 was adjusted such as to match the center of each marker 83 with the center of fitting pin 86 to be inserted into the V-shaped groove 85. FIG. 16 is a diagram showing a cross section of a wafer sample after formation of the V-shaped groove. In order to illustrate a cross section of the structure of the buried and non-buried regions, the portion of the sample where buried and non-buried regions appear on both sides of the V-shaped groove, was selected. The structure can be observed when the wafer as shown in FIG. 15 (A) and 15 (B) is diagonally cut. It should be noted that when the wafer is cut vertically with respect to the V-shaped groove, a structure in which both sides of the V-shaped groove are buried can be observed.

Then, the obtained waveguides were diced by a dicing saw, and thus, a number of waveguides elements 8 were obtained.

Figure 17:
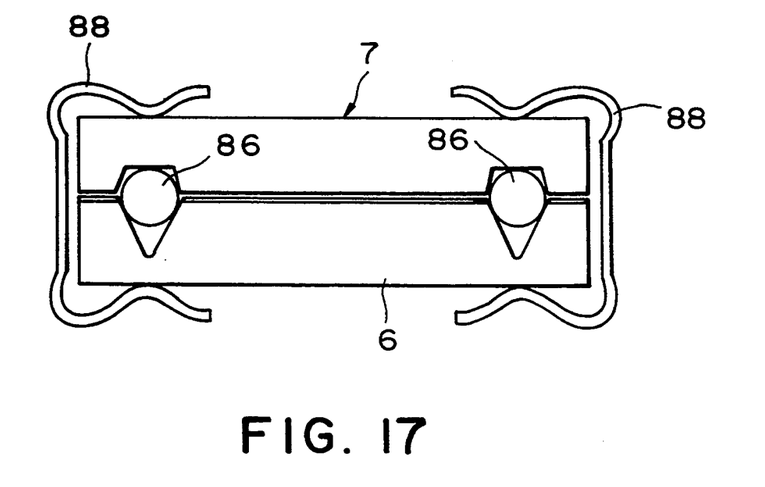
FIG. 17 is a cross section of the waveguide module assembled.
Figure 18A:
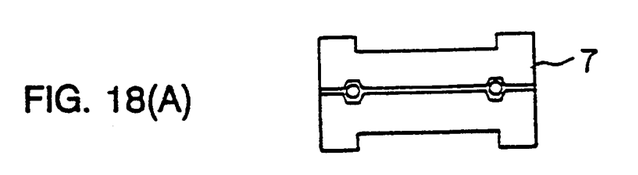
Figure 18B:
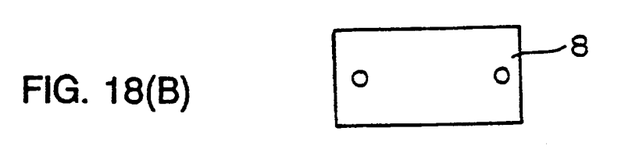
Figure 18C:
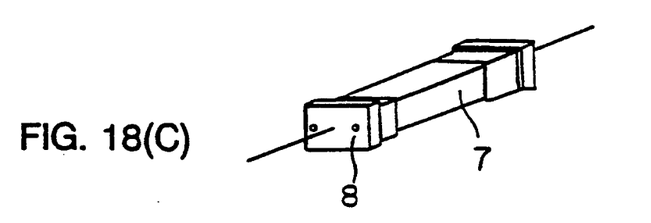

A waveguide element 6 thus obtained and a silicon substrate 87 on which grooves were formed by the cutting process mentioned before, were assembled together while fitting a fitting pin in each of the grooves, and fixed with each other by means of a spring 88 as shown in FIG. 17, or adhered with each other by adhesive, thereby completing a fitting waveguide module 7. A fitting waveguide module 7 as shown in FIG. 18 (A) and an optical fiber connector 8 shown in FIG. 18 (B) were connected with each other as shown in FIG. 18 (C), and the connection was examined in terms of connection loss. The result indicated that they were connected at a connection loss of as low as 0.3 dB–1.0 dB.

EXAMPLE 4

A low substrate 60 was manufactured by a method similar to that of Example 2, and both end faces 60a and 60b thereof were polished. The substrate 60 was fixed onto a fixation base 66 by adhesive. Then, four fitting pins 61 were placed on V grooves 59 such that the center of each fitting pin 61 was leveled with the center of waveguide 56 or 57 in each end face. While pressing each fitting pin 61 against each V groove 59 such that the pin is brought into tight contact with the two sides of the V groove, and each fitting pin 61 was fixed to the lower substrate 60 by adhesive, thereby manufacturing an optical waveguide module 4.

An optical fiber connector 5 was brought to face to each of the end faces of a waveguide module 4 while aligning them with each other by means of an fitting pin 61. Further, adhesive was applied onto each end face, and the waveguide module 4 and the optical fiber connectors were connected with each other by hardening the adhesive by heat as being pressed with each other.

Waveguide module and optical fiber connectors manufactured according to this example were subjected to a connection test so as to examine the connection of each sample in terms of connection loss. The connection loss was an average of 0.5 dB, with a maximum of 1 dB.

Next, an optical fiber connector and a waveguide-use press cover were manufactured from glass ceramic which transmits the light in a range of 350 nm–450 nm at a transmissibility of 20% or higher. Adhesive used for each interface here was of a Uv setting type having an index of reflection of 1.456, which is close to that of silica glass, by which the Fresnel reflection at the interface can be small as small as possible. Thus, a UV light was irradiated on the interface from above.

With this method, similar results to those of the above connection test were obtained. Further, the manufacturing time was significantly shortened as compared to that case where the thermosetting type adhesive was used.

EXAMPLE 5

In place of ceramic, silicon was used as a material for an optical fiber connector, and subjected to cutting process by use of a slicer so as to form V grooves 71 and 72. Optical fibers thus formed were assembled as in Example 2, and subjected to a test so as to examine its connection in terms of connection loss. The initial values thereof were similar to those of Example 2, and thus it was confirmed that the optical fibers manufactured as above can be connected with each other at a connection loss of an average of 0.5 dB, with a maximum of 1 dB.

The connected optical fiber connectors were subjected to a heat cycle test, and the loss variation obtained in the test carried out at a temperature of from −10° C. to −60° C., was within a range of ±0.2 dB. As compared to the result obtained with the ceramic-made optical fiber connector, i.e., a loss variation of 0.5 dB or higher, the optical fibers of this example exhibited a significantly improved loss variation.

In general, the coefficient of linear expansion of silicon is about $2 \times 10^{-6}$/° C., whereas that of ceramic is about $10 \times 10^{-6}$/° C. when silicon is used for the waveguide, and ceramic is used for the optical fiber connector, there results an about 1 μm of pitch deviation of the fitting pin V grooves at the interface in the case of a high or low temperature due to difference in coefficient of heat expansion between the two materials. In order to compensate this, either the waveguide module or the optical fiber connector is warped, producing the connection loss due to an axis deviation. The reason why the loss variation was relatively small should be that the same material was used for the waveguide module and the optical fiber connector.

As described above, in this example, a waveguide module and an optical fiber connector were made of materials having the same coefficient of linear expansion. Therefore, a pitch deviation such as above does not occur, thereby decreasing a loss variation caused by heat cycle.

EXAMPLE 6

This example was designed to confirm the result obtained in Example 5, and examine how a difference in coefficient of linear expansion has an influence on a loss variation. In the example, 10 types of optical fiber connectors were prepared by using 10 types of glass ceramic materials each having a coefficient of linear expansion from $1 \times 10^{-6}$/° C. to $10 \times 10^{-6}$° C. differing one from another by $1 \times 10^{-6}$/° C. The optical fiber connectors thus manufactured were subjected to a heat cycle test at the same temperature as mentioned above. From this test, it was confirmed that the loss variation was within a range of ±0.2 dB with an optical fiber connector made of glass ceramic having a coefficient of linear expansion of $7 \times 10^{-6}$/° C.

Thus, it can be concluded that a loss variation depends mainly upon a difference in coefficient of linear expansion between materials used to manufacture a waveguide module and an optical fiber connector. In the case where the pitch of the V grooves 72 is about 4.6 mm, the loss variation at a high or low temperature can be controlled by setting the difference in coefficient of linear expansion between the waveguide module and the optical fiber connector at $7 \times 10^{-6}$/° C.

EXAMPLE 7

Figure 19:
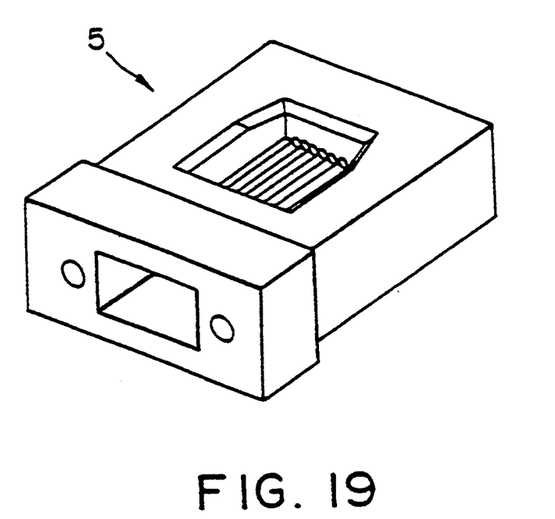
FIG. 19 is a schematic view showing an optical fiber connector manufactured by the plastic molding method according to the invention.

In place of a ceramic-made optical fiber connector discussed in Example 2, an optical fiber connector made by plastic molding, such as shown in FIG. 19, was used in this example. The optical fiber connector used here was of the same type as that generally used as a multicore fiber connector. As compared to those made by forming grooves thereon in cutting process using a slicer, the production cost can be made low, and further mass production of such a plastic optical fiber connector can be easily achieved. With the product of this example, the connection loss was an average of 0.5 B, with a maximum of 1 dB, per one connection.

EXAMPLE 8

In this example, a waveguide module was made of the same material as that of the waveguide module discussed in Example 2. The fitting pins were connected to both waveguide module and optical fiber connector by means of epoxy adhesive. Although the waveguide module and the optical fiber connector of this example could not be detached from each other, the variance of the light output intensity caused by external factors such as vibration and the like could be made extremely small as 0.02 dB or lower.

Even in the case where the fitting pin was fixed to either the waveguide module or the optical fiber connector by means of adhesive, the variance of the light output intensity caused by the external factors such as vibration and the like could be made smaller than the case where the fitting pin was not fixed.

As described above, according to the method of the present invention, markers are formed without embedding them, and alignment of fiber and waveguide are carried out based on the position of each marker as a reference. More specifically, the distance between a waveguide and a guide groove formed in a waveguide element is set to be exactly the same as the distance between a corresponding optical fiber and a corresponding guide groove or hole, and therefore the waveguide and the optical fiber can be connected at a high accuracy without actually aligning them with each other. Consequently, the time required for connecting optical fibers can be significantly shortened. Further, the marker is not completely embedded, and a portion thereof can be observed; therefore the marker can be easily remarked as a reference for positioning.

Thus, an optical axis deviation between a waveguide and an optical fiber can be made small, and they can be optically connected at a low loss. Also, a waveguide part containing an waveguide element and an optical fiber connector can be positioned with each other by inserting fitting pins into each other, and therefore the waveguide part itself can be used a type of detachable connector. As compared with a conventional method in which a waveguide module and an optical fiber connector are fixedly connected with each other semi-permanently by means of adhesive or the like, and an optical fiber projecting out in a pig-tail manner from the waveguide part is connected to another optical fiber of another part by the fusion connection technique, the connection loss can be reduced, and the housing space for a connection portion can be reduced according to the present invention.

Moreover, the difference in coefficient of linear expansion between materials used for preparing a waveguide module and an optical fiber connector can be made no higher than a certain value in the invention; therefore the loss variance at a high or low temperature can be suppressed.

We claim:

1. A method of connecting optical fibers and waveguides with each other, comprising the steps of:
    coating a lower clad layer formed on a first substrate with a waveguide material;
    patterning said waveguide material by a photolithography method so as to form:

a plurality of parallel waveguides with a predetermined interval between adjacent waveguides; and a marker located at a predetermined distance away from a particular one of said waveguides;

forming an upper clad layer on a region except where the marker is located so as to manufacture a light wave circuit;

forming a first fitting pin groove having a V-shaped cross section for receiving a first fitting pin, therein, said fitting pin groove and said marker, thereby manufacturing a waveguide module;

forming a plurality of optical fiber grooves on a second substrate for fixing a plurality of optical fibers therein;

forming a second fitting pin groove or hole that is usable for alignment with said marker on said first substrate;

fixing each of said plurality of optical fibers into respective ones of said plurality of optical fiber grooves, thereby manufacturing an optical fiber connector; and inserting the first fitting pin into the first fitting pin groove of said waveguide, and into the second fitting pin groove or hole so as to align the first and second substrates with each other, thereby connecting each of the optical fibers and each of the light wave circuits.

2. A method of connecting optical waveguides and optical fibers according to claim 1, wherein a press cover is placed on at least one of the first and second substrates.

3. A method of connecting optical waveguides and optical fibers according to claim 1, comprising finishing an end surface of the optical fiber connector so as to have a mirror-like finish.

4. A method of connecting optical waveguides and optical fibers according to claim 1, comprising applying a matching agent on a to-be-connected surface of each optical fiber and to each waveguide of said light wave circuit.

5. A method of connecting optical waveguides and optical fibers according to claim 1, wherein a coefficient of linear expansion of a material used for the waveguide module is substantially the same as a coefficient of expansion of the optical fiber connector.

6. A method of connecting a plurality of optical fibers and a plurality of optical waveguides with each other, comprising the steps of:

manufacturing the plurality of optical waveguides by:
coating a lower clad layer formed on a first substrate with a waveguide material;
patterning said waveguide material by a photolithography method so as to form a light wave circuit that has a plurality of parallel waveguides that correspond to a plurality of parallel optical fibers that are provided on a second substrate, said plurality of optical waveguides having a predetermined interval provided between adjacent parallel waveguides;

forming at least one marker on said first substrate, said at least one marker being located at a predetermined distance away from a particular one of said plurality of optical waveguides; and forming an upper clad layer over the patterned waveguide material, on portions other than where said at least one marker is located on said first substrate, to facilitate an alignment of said plurality of waveguides with said plurality of optical fibers; and using said second substrate to manufacture an optical fiber core block by:
forming a plurality of optical fiber grooves in said second substrate, each optical fiber groove having a V-shaped cross-section for respectively receiving and fixing therein one of said plurality of optical fibers;
forming at least one marker-use groove having a V-shaped cross-section for facilitating alignment of said at least one marker on said first substrate with said second substrate; and
setting said plurality of optical fibers into respective ones of said plurality of optical fiber grooves to thereby manufacture said optical fiber core block; and then aligning said at least one marker of the first substrate and said at least one marker-use groove of said second substrate with each other as the first and second substrates are brought into contact with each other so as to connect each of said plurality of optical fibers with a respective one of said plurality of optical waveguides.

7. A method of connecting optical waveguides and optical fibers according to claim 6 wherein said first fitting pin groove is formed such that a center of a core of a light wave circuit is level with a center of the first fitting pin.

8. A method of connecting optical waveguides and optical fibers according to claim 6, wherein the optical fiber connector is manufactured by a plastic molding process.

9. The method of claim 6, wherein:
said at least one marker formed on said first substrate comprises a plurality of markers; and
said at least one marker-use groove comprises a plurality of marker-use grooves.

10. The method of claim 9, wherein:
said at least one marker on said first substrate comprises a linear marker;
said at least one marker-use groove on said second substrate comprises a linear marker-use groove; and
said at least one linear marker and said at least one linear marker-use groove, when aligned with each other, aligning the first and second substrates with each other.

* * * * *